US008745257B1

(12) United States Patent
Karimov et al.

(10) Patent No.: US 8,745,257 B1
(45) Date of Patent: Jun. 3, 2014

(54) METHODS AND APPARATUS FOR RENDERING VIDEO ADVERTISING ON A MOBILE DEVICE

(75) Inventors: Ildar Karimov, Bashkortostan region (RU); Vasily Filippov, Saint-Petersburg (RU)

(73) Assignee: MobiWorldMedia, Hackensack, NJ (US)

( * ) Notice: Subject to any disclaimer, the term of this patent is extended or adjusted under 35 U.S.C. 154(b) by 87 days.

(21) Appl. No.: 13/210,820

(22) Filed: Aug. 16, 2011

(51) Int. Cl.
*G06F 15/16* (2006.01)

(52) U.S. Cl.
USPC .......................................... 709/231; 709/230

(58) Field of Classification Search
CPC .... G06Q 30/02; H04L 65/4076; H04L 65/60; H04N 21/41407
USPC ................. 709/231, 203, 217, 218, 219, 230; 725/62
See application file for complete search history.

(56) References Cited

U.S. PATENT DOCUMENTS

| 8,107,940 | B1* | 1/2012 | Jackson ......................... 455/418 |
| 2005/0215238 | A1* | 9/2005 | Macaluso .................. 455/414.1 |
| 2007/0243887 | A1* | 10/2007 | Bandhole et al. ............. 455/461 |
| 2008/0313033 | A1* | 12/2008 | Guo et al. ........................ 705/14 |
| 2009/0198580 | A1* | 8/2009 | Broberg et al. ................. 705/14 |

* cited by examiner

*Primary Examiner* — Frantz Jean
(74) *Attorney, Agent, or Firm* — Chapin IP Law, LLC (57) ABSTRACT

A system downloads a video from a remote server to a local server residing on a mobile device. The video is packaged in a first protocol, where the first protocol is selected based on a preferred download compatibility associated with the mobile device and the remote server. The system converts, on the local server, the video packaged in the first protocol to a video packaged in a second protocol. The second protocol is selected based on a capability of a video controller, residing on the mobile device, to render the video using the second protocol. The system transmits the video packaged in the second protocol from the local server to the video controller. Using the video controller, the system renders the video packaged in the second protocol on the mobile device.

20 Claims, 10 Drawing Sheets

206 DOWNLOAD THE VIDEO FROM A REMOTE SERVER TO A LOCAL SERVER RESIDING ON THE MOBILE DEVICE, THE VIDEO PACKAGED IN A FIRST PROTOCOL, THE FIRST PROTOCOL SELECTED BASED ON A PREFERRED DOWNLOAD COMPATIBILITY ASSOCIATED WITH THE MOBILE DEVICE AND THE REMOTE SERVER

> 207 SELECT THE FIRST PROTOCOL FROM A PLURALITY OF AVAILABLE PROTOCOLS DUE TO AN ESTABLISHED DOWNLOAD SUCCESS BETWEEN THE FIRST PROTOCOL AND THE REMOTE SERVER

OR

> 208 SELECT THE FIRST PROTOCOL FROM A PLURALITY OF AVAILABLE PROTOCOLS DUE TO A GREATER DOWNLOAD SUCCESS BETWEEN THE FIRST PROTOCOL AND THE REMOTE SERVER AS COMPARED TO A LESSER DOWNLOAD SUCCESS BETWEEN WITH THE SECOND PROTOCOL AND THE REMOTE SERVER

OR

> 209 SELECT THE FIRST PROTOCOL BASED ON A DOWNLOAD RATE BETWEEN THE FIRST PROTOCOL AND THE REMOTE SERVER
>
>> 210 DYNAMICALLY SELECT THE FIRST PROTOCOL BASED ON THE DOWNLOAD RATE BETWEEN THE FIRST PROTOCOL AND THE REMOTE SERVER AT THE TIME OF THE DOWNLOAD OF THE VIDEO

231 TRANSMIT THE VIDEO PACKAGED IN THE SECOND PROTOCOL FROM THE LOCAL SERVER TO THE VIDEO CONTROLLER

232 INSTRUCT THE VIDEO CONTROLLER TO CONNECT TO THE LOCAL SERVER TO RECEIVE TRANSMISSION OF THE VIDEO PACKAGED IN THE SECOND PROTOCOL FROM THE LOCAL SERVER

*FIG. 10*

METHODS AND APPARATUS FOR RENDERING VIDEO ADVERTISING ON A MOBILE DEVICE

CROSS REFERENCE TO RELATED APPLICATIONS

This application relates to the following applications filed on the same date as the present application:

i) "METHODS AND APPARATUS FOR RENDERING A VIDEO ON A MOBILE DEVICE UTILIZING A LOCAL SERVER", Filed, Ser. No. 13/210,856

BACKGROUND

New technologies allow users, via computerized communication devices (i.e., cellular telephones, Personal Digital Assistants (PDAs), laptops, tablets, iPads®, iPods®, etc.), such as mobile devices, to view television programs (that are currently being aired by television channel providers) as if those viewers were watching those television programs on their television set at home. For example, a user with a mobile device may watch a live sports event, broadcast by a television channel provider, from any location where the mobile device can access communication. Streaming video of the television show is accessed from the television channel providers, and downloaded onto the mobile device. When a user selects a channel to watch (i.e., live TV video or on-demand videos) using their mobile devices, the mobile device connects to a live streaming TV remote server, and renders the live TV video on the mobile device.

SUMMARY

Conventional computerized technologies for rendering video on a computerized device, such as a mobile device, suffer from a variety of deficiencies. In particular, conventional technologies for rendering a video are limited in that conventional technologies delivering live TV video on a mobile device, such as a mobile phone, use protocols that may vary from platform to platform. Some protocols, such as Real Time Streaming Protocol (RTSP), may be good for streaming live TV video, but may not work on all networks, such as $3^{rd}$ Generation (3G) networks. Additionally, RTSP tends to be unstable when the user holding the mobile device is moving from location to location. Better protocols exist, such as "HTTP Live Streaming" and/or "HTTP Smooth Streaming", which are allowed on all networks. However, not all platforms can use these two protocols because there is no built in support for the video controller to use these protocols. The video controller is a native component in mobile operating systems that is responsible for showing streaming video. Usually this component is developed either by an operating system vendor or by a phone vendor, and is provided for third-party software developers as a component they can use in their programs. Thus, some protocols are better for streaming video, while other protocols are better for rendering the video on the mobile device.

Embodiments disclosed herein significantly overcome such deficiencies and provide a system that includes a computer system and/or software executing a video rendering process that downloads a video from a remote server (such as a live streaming TV remote server, or an advertisement server), using a first protocol (i.e., a protocol that is compatible with the mobile device and the live streaming TV remote server, or the advertisement server), to a local server that resides on the mobile device. The first protocol is selected based on a preferred compatibility associated with the mobile device and the remote server (i.e., the live streaming TV remote server, or the advertisement server). For example, the protocol that can communicate more effectively with the live streaming TV remote server is selected as the first protocol. The local server converts the video packaged in the first protocol to a video packaged in a second protocol where the second protocol is compatible with the video controller. The local server transmits the video packaged in the second protocol to the video controller, and the video controller renders the video on the mobile device. Thus, the video is downloaded from the live streaming TV remote server (or the advertisement server) to the local server using a first protocol that can communicate effectively with the remote server, and the local server converts the video packaged in that first protocol to a video packaged in a second protocol that the video controller is capable of using when the video controller renders the video on the mobile device. The mobile device user receives the best of both worlds (i.e., the best of both protocols) in terms of streaming video, and rendering the video on the mobile device. The user can still connect to certain networks (for example, 3G networks) using the first protocol even if the video controller does not support the first protocol, while still using the second protocol that the video controller does support for rendering the video on the mobile device.

In an example embodiment, the video rendering process instructs the video controller to connect to the local server to receive transmission of the video packaged in the second protocol from the local server. In another example embodiment, the video rendering process may provide an updated first protocol to the mobile device, and then instruct the local server to use the updated first protocol when downloading the video from the remote server to the local server.

In an example embodiment, the video rendering process selects the first protocol, from a plurality of available protocols, due to an established download success between the first protocol and the remote server. In other words, the video rendering process selects the first protocol that can effectively operate with the remote server. In another example embodiment, the video rendering process selects the first protocol, from a plurality of available protocols, due to a greater download success between the first protocol and the remote server as compared to a lesser download success between the second protocol and the remote server. In other words, the video rendering process selects a first protocol that operates more effectively at downloading the video from the remote server than the second protocol that the video controller supports. Some second protocols can download, for example, live streaming TV video from a remote server, but do not perform this function very well, or as well as the first protocol (that is chosen based on the first protocol's ability to download video effectively from a remote server).

In an example embodiment, the video rendering process selects the first protocol based on a download rate between the first protocol and the remote server. In another example embodiment, the video rendering process dynamically selects the first protocol based on the download rate between the first protocol and the remote server at the time of the download of the video. For example, the protocol that can download the video quickly (at the time of the download) is the protocol that's chosen as the first protocol.

In an example embodiment, the video rendering process selects the first protocol, from a plurality of available protocols, due to probability of a download success associated between the first protocol and a plurality of remote servers. For example, the first protocol is selected to reduce the number of protocols the mobile device needs to maintain to download videos from each of the plurality of remote servers.

In an example embodiment, a mobile application, residing on the mobile device, transmits the selection of the first protocol to the local server, and instructs the local server to use the first protocol when downloading the video from the remote server. In another example embodiment, the mobile application receives information associated with the first protocol from a main authorization server. Based on that information, the video rendering process selects the first protocol, and instructs the local server to use the first protocol when downloading the video from the remote server.

In an example embodiment, the video rendering process detects that the second protocol (i.e., the protocol that the video controller supports) is incompatible with the remote server, and selects a first protocol that is compatible with the remote server. The local server then uses the first protocol to download the video from the remote server to the local server.

In an example embodiment, the video rendering process determines that the second protocol (i.e., the protocol that the video controller supports) can communicate with the remote server, but results in an unstable connection, for example, when the user moves from location to location while using the mobile device. The video rendering process then selects the first protocol to download the video from the remote server to the local server. The first protocol is selected based on its ability to maintain a stable connection between the mobile device and the remote server.

In an example embodiment, after the video is downloaded to the local server, the video rendering process caches the video on the local server. The video may be rendered at a later time from the local server. In another example embodiment, the video rendering process renders a previously cached video while the video rendering process is downloading the video from the remote server. The video rendering process renders the cached video from the local server.

In an example embodiment, the video rendering process detects that a mobile application, residing on the mobile device, has been launched. The video rendering process identifies the second protocol that is compatible with the video controller, and transmits second protocol identification to the local server. The second protocol identification is transmitted from the mobile application to the local server. The local server then converts the video packaged in the first protocol to the video packaged in a second protocol, and the video controller renders the video packaged in the second protocol (i.e., the protocol that the video controller is capable of using when rendering a video) on the mobile device.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by SPB Software, Inc. of Carson City, Nev., USA.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system executing a video rendering process that downloads a video from a remote server (such as a live streaming TV remote server, or an advertisement server), using a first protocol (i.e., a protocol that is compatible with the mobile device and the live streaming TV remote server, or the advertisement server), to a local server that resides on the mobile device. The first protocol is selected based on a preferred compatibility associated with the mobile device and the remote server (i.e., the live streaming TV remote server, or the advertisement server). For example, the protocol that can communicate more effectively with the live streaming TV remote server is selected as the first protocol. The local server converts the video packaged in the first protocol to a video packaged in a second protocol where the second protocol is compatible with the video controller. The local server transmits the video packaged in the second protocol to the video controller, and the video controller renders the video on the mobile device. Thus, the video is downloaded from the live streaming TV remote server (or the advertisement server) to the local server using a first protocol that can communicate effectively with the remote server. The local server converts the video packaged in that first protocol to a video packaged in a second protocol that the video controller is capable of using when the video controller renders the video on the mobile device. The user can still connect to certain networks (for example, 3G networks) using the first protocol even if the video controller does not support the first protocol, while still using the second protocol that the video controller does support for rendering the video on the mobile device.

Figure 1:
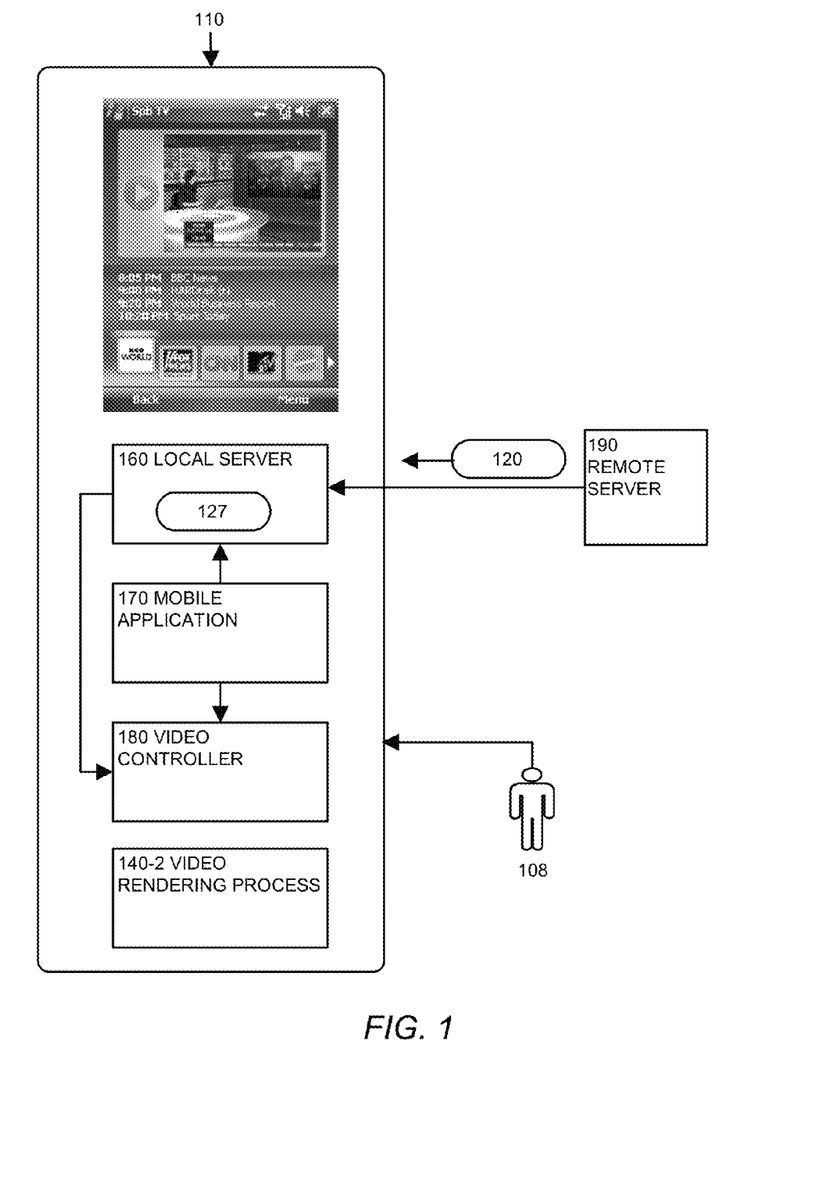
FIG. 1 shows a high-level block diagram of a system according to one embodiment disclosed herein.

FIG. 1 is a block diagram illustrating example architecture of embodiments disclosed herein. A mobile device 110, such as a mobile phone, communicates with a remote server 190 (such as an advertisement server, or a live streaming TV remote server) to download a video packaged in a first protocol 120, such as an advertisement video, or a live streaming TV video. The mobile device 110 contains a mobile application 170, residing on the mobile device 110. The mobile application 170 communicates with a local server 160 and a video controller 180, both of which also reside on the mobile device 110. The local server 160 requests the video packaged in a first protocol 120 from the remote server 190. In response, the remote server 190 transmits the video packaged in a first protocol 120 to the local server 160. The local server 160 converts the video packaged in the first protocol 120 to a video packaged in a second protocol. The video controller 180 supports the second protocol. The video controller 180 renders the video packaged in a second protocol.

When a user 108 requests a video, the video rendering process 140-2 renders a video packaged in a second protocol live from the remote server 190, or renders a previously cached video 127 that was downloaded from the remote server 190, and cached on the local server 160. For example, the video rendering process 140-2 might download a video packaged in a first protocol 120 such as an advertisement video from an advertisement server (i.e., a remote server 190), and cache the advertisement video (now a cached video 127) on the local server 160 for the video controller 180 to render at a later time. Rendering the video packaged in a second protocol live from the remote server 190 means the video packaged in the first protocol 120 is downloaded from the remote server 190, and converted to a video packaged in the second protocol for the video controller 180 to render on the mobile device 110.

Figure 2:
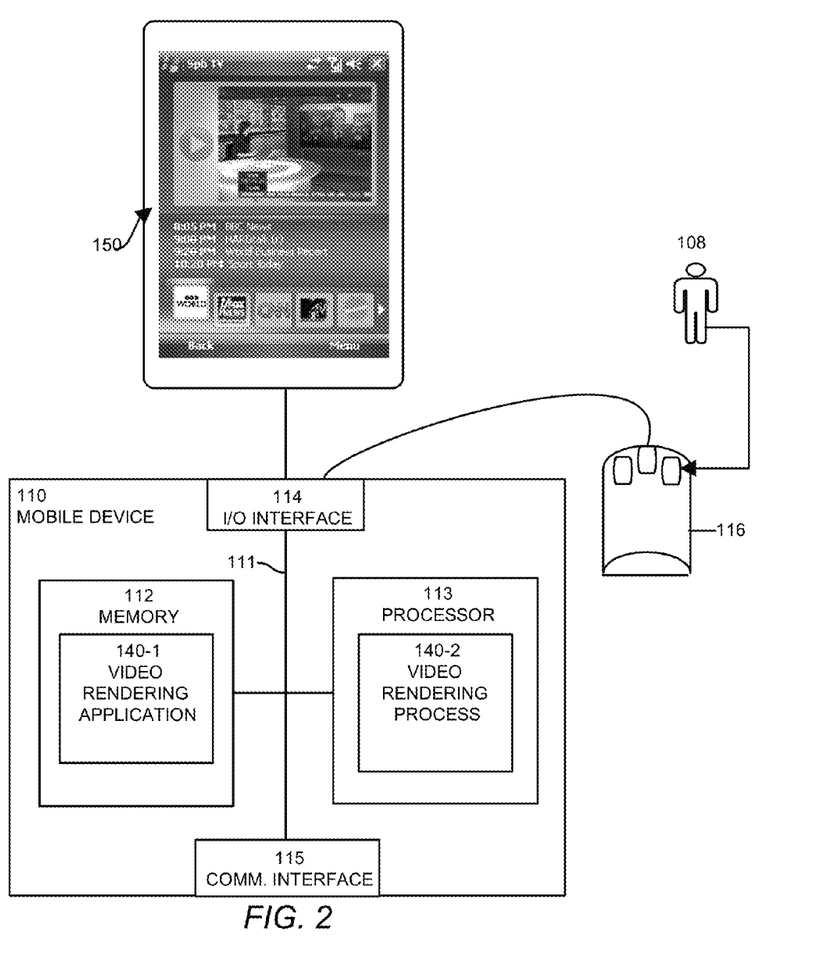
FIG. 2 shows a high-level block diagram of a mobile device according to one embodiment disclosed herein.

FIG. 2 is a block diagram illustrating example architecture of a mobile device 110 that executes, runs, interprets, operates or otherwise performs a video rendering application 140-1 and video rendering process 140-2 suitable for use in explaining example configurations disclosed herein. The mobile device 110 may be any type of computerized device such as a personal computer, workstation, portable computing device, console, laptop, network terminal or the like. An input device 116 (e.g., one or more user/developer controlled devices such as a keyboard, mouse, touch screen, etc.) couples to processor 113 through I/O interface 114, and enables a user 108 to provide input commands, and generally control a graphical user interface that the video rendering application 140-1 and process 140-2 provides on the display 150. As shown in this example, the mobile device 110 includes an interconnection mechanism 111 such as a data bus or other circuitry that couples a memory system 112, a processor 113, an input/output interface 114, and a communications interface 115. The communications interface 115 enables the mobile device 110 to communicate with other devices (i.e., other computers) on a network (not shown).

The memory system 112 is any type of computer readable medium, and in this example, is encoded with a video rendering application 140-1 as explained herein. The video rendering application 140-1 may be embodied as software code such as data and/or logic instructions (e.g., code stored in the memory or on another computer readable medium such as a removable disk) that supports processing functionality according to different embodiments described herein. During operation of the mobile device 110, the processor 113 accesses the memory system 112 via the interconnect 111 in order to launch, run, execute, interpret or otherwise perform the logic instructions of a video rendering application 140-1. Execution of a video rendering application 140-1 in this manner produces processing functionality in video rendering process 140-2. In other words, the video rendering process 140-2 represents one or more portions or runtime instances of a video rendering application 140-1 (or the entire a video rendering application 140-1) performing or executing within or upon the processor 113 in the mobile device 110 at runtime.

It is noted that example configurations disclosed herein include the video rendering application 140-1 itself (i.e., in the form of un-executed or non-performing logic instructions and/or data). The video rendering application 140-1 may be stored on a computer readable medium (such as a floppy disk), hard disk, electronic, magnetic, optical, or other computer readable medium. A video rendering application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a video rendering application 140-1 in the processor 113 as the video rendering process 140-2. Those skilled in the art will understand that the mobile device 110 may include other processes and/or software and hardware components, such as an operating system not shown in this example.

A display 150 need not be coupled directly to mobile device 110. For example, the video rendering application 140-1 can be executed on a remotely accessible mobile device 110 via the network interface 115. In this instance, the display 150 may be displayed locally to a user 108 of the remote computer, and execution of the processing herein may be client-server based.

Figure 3:
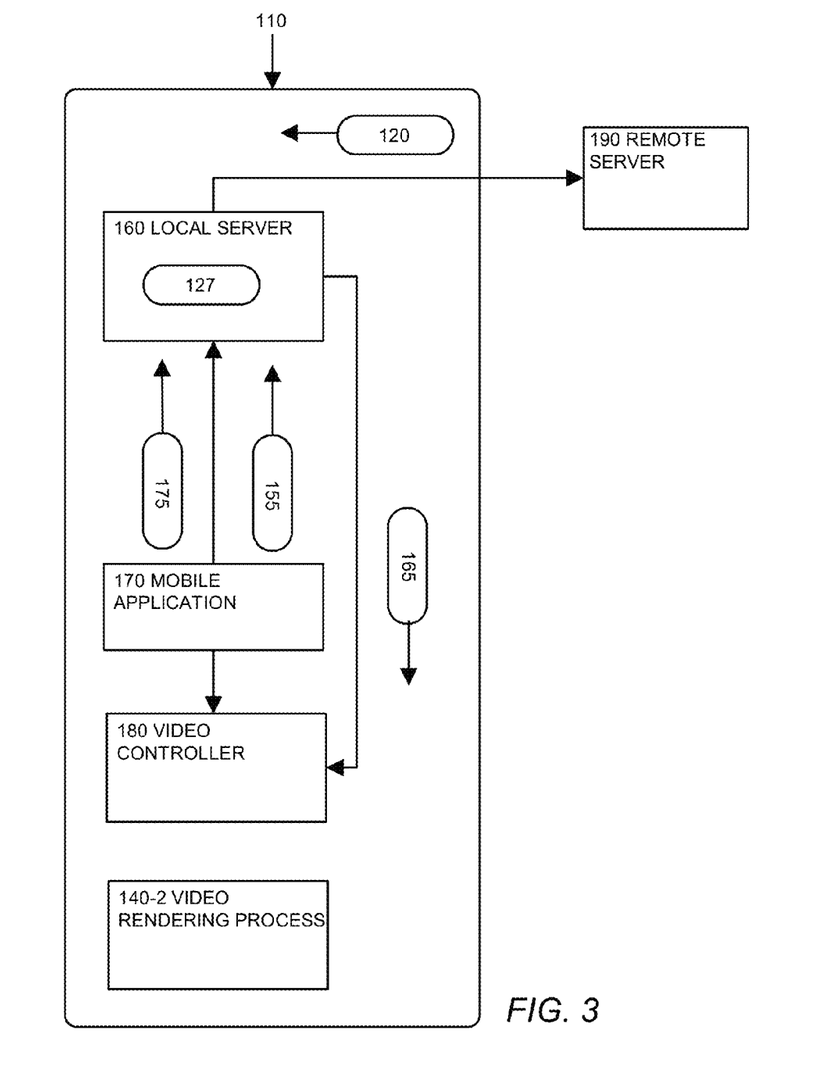
FIG. 3 shows a high-level block diagram of handshaking between components residing within the mobile device depicted in FIG. 1, according to one embodiment disclosed herein.

FIG. 3 is a block diagram illustrating example architecture of handshaking between components residing within the mobile device 110. The mobile device 110 contains a local server 160, mobile application 170 and video controller 180. The local server 160 communicates with the remote server 190. The local server 160 downloads the video packaged in a first protocol 120 from the remote server 190. In an example embodiment, the video rendering process 140-2 caches the video (i.e., a cached video 127) on the local server 160 for rendering, by the video controller 180, at a later time.

In an example embodiment, the mobile application 170 transmits first protocol identification 175 to the local server 160, and instructs the local server 160 to use the first protocol when downloading the video packaged in the first protocol 120 from the remote server 190 to the local server 160. In another example embodiment, the mobile application 170 transmits second protocol identification 155 to the local server 160. The local server 160 converts the video packaged in the first protocol 120 to a video packaged in the second protocol 165. The local server 160 transmits the video packaged in a second protocol 165 to the video controller 180, and the video controller 180 renders the video packaged in a second protocol 165 on the mobile device 110.

Further details of configurations explained herein will now be provided with respect to a flow chart of processing steps that show the high level operations disclosed herein to perform the video rendering process 140-2.

Figure 4:
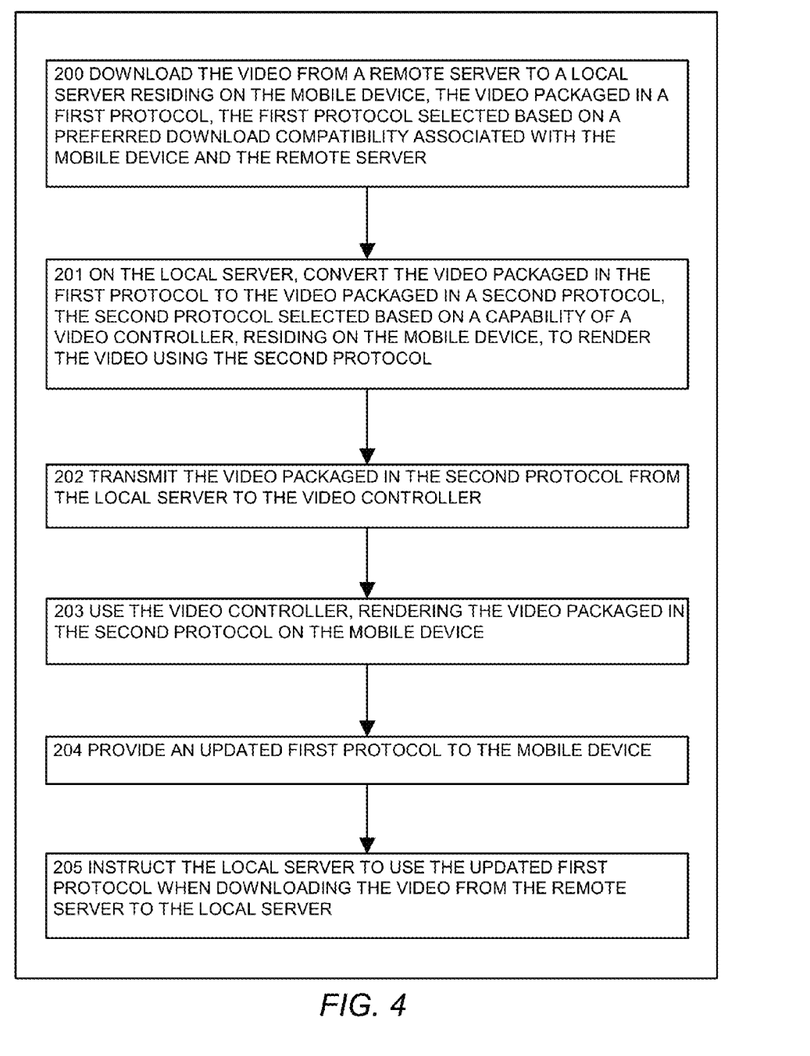
FIG. 4 illustrates a flowchart of a procedure performed by the system of FIG. 1, when the video rendering process downloads the video from a remote server to a local server residing on the mobile device, according to one embodiment disclosed herein.

FIG. 4 is an embodiment of the steps performed by video rendering process 140-2 when it downloads the video packaged in a first protocol 120 from a remote server 190 to a local server 160 residing on the mobile device 110.

In step 200, the video rendering process 140-2 downloads the video packaged in a first protocol 120 from a remote server 190 to a local server 160 residing on the mobile device 110. In an example embodiment, the remote server 190 may be a live streaming TV remote server that streams live TV videos. In another example embodiment, the remote server 190 may be an advertisement server that provides advertisement videos that are rendered on the mobile device 110 prior to rendering, for example, a live streaming TV video. In other words, the user 108 views an advertisement prior to watching the TV channel the user 108 has selected to view on the mobile device 110.

The first protocol is selected based on a preferred download compatibility associated with the mobile device 110 and the remote server 190. In other words, the better protocol for downloading the video from the remote server 190 is selected as the first protocol. In an example embodiment, the second protocol (i.e., the protocol that the video controller 180 supports) built into the mobile device 110 may not be compatible with the remote server 190, or the second protocol might be compatible with the remote server 190, but might not work as well some other available protocols. In this scenario, the video rendering process 140-2 selects a first protocol that will work better with the remote server 190 than the second protocol associated with the video controller 180. The video rendering process 140-2 then downloads the video packaged in a first protocol 120 from the remote server 190 to the local server 160 that resides on the mobile device 110.

In step 201, the video rendering process 140-2 converts, on the local server 160, the video packaged in a first protocol 120 to the video packaged in a second protocol 165. The second protocol is selected based on a capability of a video controller 180 residing on the mobile device 110 to render the video packaged in a second protocol 165, on the mobile device 110 (i.e., whichever second protocol the video control 180 supports). In an example embodiment, the video rendering process 140-2 selects a first protocol that will work better with the remote server 190 than the second protocol associated with the video controller 180. The video rendering process 140-2 then downloads the video packaged in a first protocol 120 from the remote server 190 to the local server 160 that resides on the mobile device 110, and the local server 160 converts the video packaged in a first protocol 120 to a video packaged in a second protocol 165 where the second protocol is compatible with the video controller 180.

In step 202, the video rendering process 140-2 transmits the video packaged in a second protocol 165 from the local server 160 to the video controller 180. In an example embodiment, when the local server 160 has converted the video packaged in a first protocol 120 to the video packaged in a second protocol 165, the local server 160 transmits the video packaged in a second protocol 165 to the video controller 180 for rendering. The video controller 180 is a native component in mobile operating systems that is responsible for showing streaming video, such as live streaming TV video or an advertisement video.

In step 203, the video rendering process 140-2, using the video controller 180, renders the video packaged in a second protocol 165 on the mobile device 110. In an example embodiment, a user 108 requests a video, such as a live streaming TV video, from a remote server 190, where the second protocol that the video controller 180, on the mobile device 110, supports is not compatible with the remote server 190. The video rendering process 140-2 downloads the video packaged in a first protocol 120 from the remote server 190. The local server 160 converts the video packaged in a first protocol 120 to a video packaged in a second protocol 165, and transmits the video packaged in a second protocol 165 to the video controller 180 where the video controller 180 renders the video packaged in a second protocol 165 on the mobile device 110. From the user's 108 perspective, both the downloading and the rendering of the video operate effectively because the appropriate protocol was selected for each of the steps of downloading and rendering.

In step 204, the video rendering process 140-2 provides an updated first protocol to the mobile device 110. In an example embodiment, a plugin is available that updates the first protocol (or multiple first protocols) on the mobile device 110 so that the mobile device 110 maintains the most effective protocols for downloading videos from the remote server 190.

In step 205, the video rendering process 140-2 instructs the local server 160 to use the updated first protocol when downloading the video from the remote server 190 to the local server 160. In an example embodiment, the video rendering process 140-2 provides the mobile device 110 with an updated first protocol with which to download the video packaged in a first protocol 120 from the remote server 190. The video rendering process 140-2 then instructs the local server 160 to use the updated protocol when downloading the video packaged in a first protocol 120 from the remote server 190.

Figure 5:
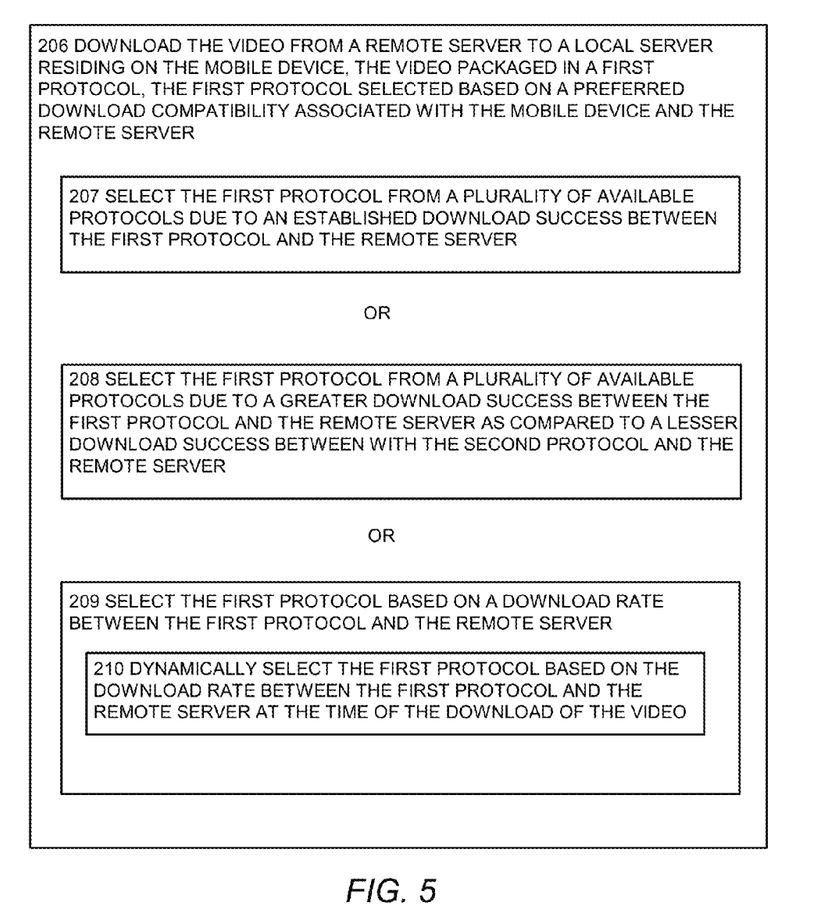
FIG. 5 illustrates a flowchart of a procedure performed by the system of FIG. 1, when the video rendering process downloads the video from a remote server to a local server residing on the mobile device, and selects the first protocol from a plurality of available protocols, according to one embodiment disclosed herein.

FIG. 5 is an embodiment of the steps performed by video rendering process 140-2 when it downloads the video packaged in a first protocol 120 from a remote server 190 to a local server 160 residing on the mobile device 110.

In step 206, the video rendering process 140-2 downloads the video packaged in a first protocol 120 from a remote server 190 to a local server 160 residing on the mobile device 110. The first protocol is selected based on a preferred download compatibility associated with the mobile device 110 and the remote server 190. In an example embodiment, the second protocol (built into the mobile device 110 to work with the video controller 180) may not download the video from the remote server 190 as quickly as the first protocol. The video rendering process 140-2 selects a first protocol that will work better with the remote server 190 than the second protocol supported by the video controller 180. The video rendering process 140-2 then downloads the video packaged in a first protocol 120 from the remote server 190 to the local server 160 that resides on the mobile device 110.

In step 207, the video rendering process 140-2 selects the first protocol from a plurality of available protocols due to an established download success between the first protocol and the remote server 190. In an example embodiment, the video rendering process 140-2 selects the first protocol from the available protocols based on the first protocol's ability to communicate with the remote server 190.

Alternatively, in step 208, the video rendering process 140-2 selects the first protocol from a plurality of available protocols due to a greater download success between the first protocol and the remote server 190 as compared to a lesser download success between with the second protocol and the remote server 190. In an example embodiment, the second protocol supported by the video controller 180 may work effectively when downloading videos from the remote server 190. However, the video rendering process 140-2 selects a first protocol (from a plurality of available protocols) that works better than the second protocol when downloading videos from the remote server 190, and then uses that selected first protocol to download the video packaged in a first protocol 120 from the remote server 190 to the local server 160.

Alternatively, in step 209, the video rendering process 140-2 selects the first protocol based on a download rate between the first protocol and the remote server 190. In an example embodiment, the video rendering process 140-2 selects the first protocol based on how fast the video rendering process 140-2 downloads the video packaged in a first protocol 120 from the remote server 190 to the local server 160 residing on the mobile device 110.

In step 210, the video rendering process 140-2 dynamically selects the first protocol based on the download rate between the first protocol and the remote server 190 at the time of the download of the video. In an example embodiment, the video rendering process 140-2 assesses the download rate between the first protocol and the remote server 190 at the time of the download, and then dynamically selects the best or better first protocol (to download the video from the remote server 190 to the local server 160) at that time. Then the video rendering process 140-2 downloads the video packaged in a first protocol 120 from the remote server 190 to the local server 160.

Figure 6:
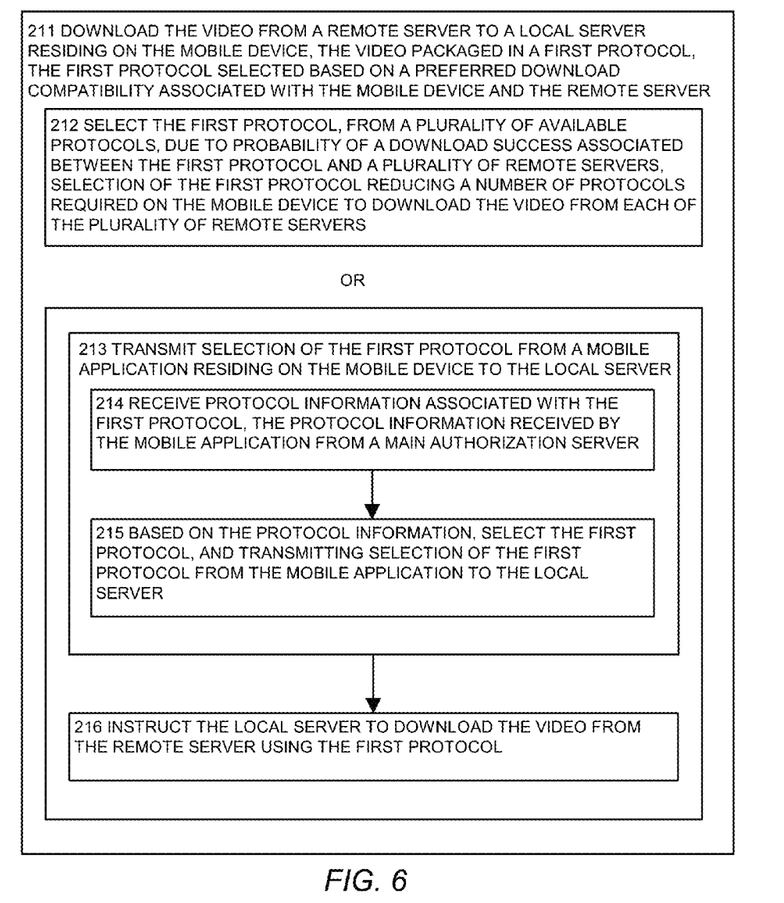
FIG. 6 illustrates a flowchart of a procedure performed by the system of FIG. 1, when the video rendering process downloads the video from a remote server to a local server, where selection of the first protocol reduces the number of protocols required on the mobile device, according to one embodiment disclosed herein.

FIG. 6 is an embodiment of the steps performed by video rendering process 140-2 when it downloads the video packaged in a first protocol 120 from a remote server 190 to a local server 160 residing on the mobile device 110.

In step 211, the video rendering process 140-2 downloads the video packaged in a first protocol 120 from a remote server 190 to a local server 160 residing on the mobile device 110. The first protocol is selected based on a preferred download compatibility associated with the mobile device 110 and the remote server 190. In an example embodiment, the preferred download compatibility may include selecting the best first protocol, the fastest first protocol, the most stable first protocol, etc.

In step 212, the video rendering process 140-2 selects the first protocol, from a plurality of available protocols, due to probability of a download success associated between the first protocol and a plurality of remote servers 190. The selection of the first protocol is intended to reduce the number of protocols mobile device 110 is required to maintain to download the videos from each of the plurality of remote servers 190. In an example embodiment, the video rendering process 140-2 downloads videos from a plurality of remote servers 190, across various networks. Some videos are live streaming TV videos downloaded from live streaming TV remote servers (i.e., a remote server 190), and some videos are advertisement videos downloaded from advertisement servers (i.e., a remote server 190). To reduce the number of protocols the video rendering process 140-2 is required to maintain on the mobile device 110, the video rendering process 140-2 selects the first protocol from a plurality of available protocols based on the probability that the selected first protocol will download videos successfully from a plurality of remote servers 190. In other words, the first protocol is selected based on the probability that the first protocol will work with a plurality of remote servers 190.

Alternatively, in step 213, the video rendering process 140-2 transmits selection of the first protocol (i.e., first protocol identification 175) from a mobile application 170 residing on the mobile device 110 to the local server 160. In an example embodiment, it is a mobile application 170, residing on the mobile device 110 that selects the first protocol, and transmits the selection of the first protocol (i.e., first protocol identification 175) from the mobile application 170 to the local server 160 where the local server 160 downloads the video packaged in a first protocol 120 from the remote server 190 to the local server 160.

In step 214, the video rendering process 140-2 receives protocol information associated with the first protocol. The protocol information is received by the mobile application 170 from a main authorization server. In an example embodiment, the mobile application 170 sends a request to the main authorization server. In response, the mobile application 170 receives the TV channel descriptions and configuration file(s) from the main authorization server, including links to live streams, and information associated with the first protocol that operates effectively with the remote server 190. In another example embodiment, the configuration file(s) may be XML files.

In step 215, the video rendering process 140-2, based on the protocol information, selects the first protocol. The mobile application 170 transmits this selection of the first protocol (i.e., first protocol identification 175) to the local server 160. Thus, in an example embodiment, the mobile application 170 selects which first protocol to use for downloading the video from the remote server 190 to the local server 160. In another example embodiment, the first protocol is hard coded on the mobile device 110.

In step 216, the video rendering process 140-2 instructs the local server 160 to download the video from the remote server 190 using the first protocol. In an example embodiment, after the first protocol has been selected, the video rendering process 140-2 instructs the local server 160 to use the first protocol when downloading the video from the remote server 190. The local server 160 downloads the video packaged in a first protocol 120 from the remote server 190 to the local server 160.

Figure 7:
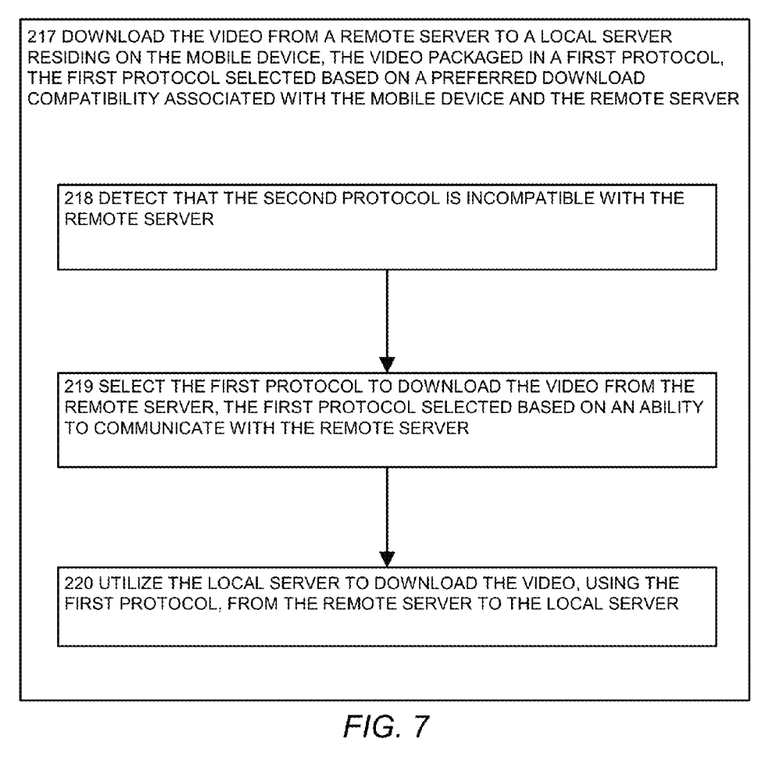
FIG. 7 illustrates a flowchart of a procedure performed by the system of FIG. 1, when the video rendering process downloads the video from a remote server to a local server residing on the mobile device, and detects that the second protocol is incompatible with the remote server, according to one embodiment disclosed herein.

FIG. 7 is an embodiment of the steps performed by video rendering process 140-2 when it downloads the video packaged in a first protocol 120 from a remote server 190 to a local server 160 residing on the mobile device 110.

In step 217, the video rendering process 140-2 downloads the video packaged in a first protocol 120 from a remote server 190 to a local server 160 residing on the mobile device 110. The first protocol is selected based on a preferred download compatibility associated with the mobile device 110 and the remote server 190. In an example embodiment, the first protocol may be selected because the first protocol is able to communicate with the remote server 190, is more stable than the second protocol associated with the video controller 180, etc.

In step 218, the video rendering process 140-2 detects that the second protocol is incompatible with the remote server 190. In an example embodiment, the second protocol supported by the video controller 180 simply cannot download videos from the remote server 190. For example, some protocols, such as Real Time Streaming Protocol (RTSP), may be good for streaming live TV video, but may not work on all networks, such as 3$^{rd}$ Generation (3G) networks. If a mobile device 110 uses RTSP, that mobile device 110 will not work on a 3G network, and the second protocol is incompatible with the remote server 190.

In step 219, the video rendering process 140-2 selects the first protocol to download the video from the remote server 190. The first protocol is selected based on an ability to communicate with the remote server 190. In an example embodiment, the second protocol cannot communicate with the remote server 190, for example, as mentioned above, RTSP cannot work on a 3G network. In this scenario, the video rendering process 140-2 selects a first protocol (that is able to work on a 3G network) to download the video from the remote server 190.

In step 220, the video rendering process 140-2 utilizes the local server 160 to download the video, using the first protocol, from the remote server 190 to the local server 160. In an example embodiment, when the video rendering process 140-2 has selected a first protocol that is compatible with the remote server 190, the local server 160 downloads the video packaged in a first protocol 120 from the remote server 190 to the local server 160.

Figure 8:
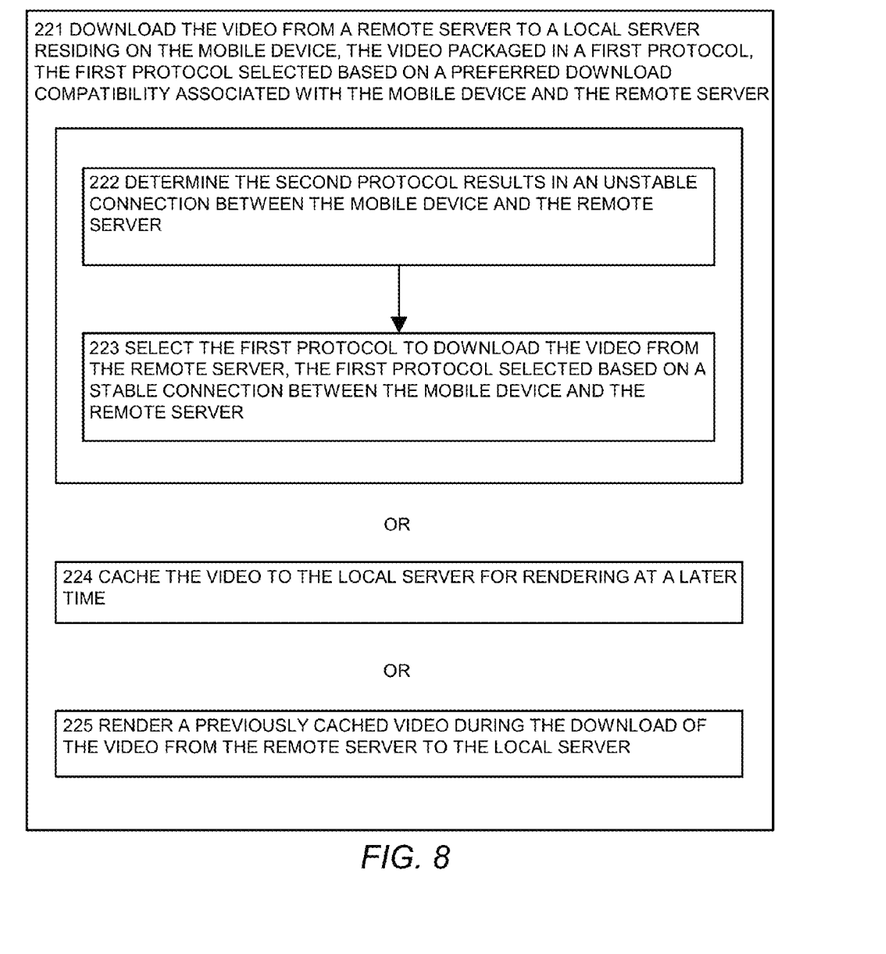
FIG. 8 illustrates a flowchart of a procedure performed by the system of FIG. 1, when the video rendering process downloads the video from a remote server to a local server residing on the mobile device, and determines the second protocol results in an unstable connection between the mobile device and the remote server, according to one embodiment disclosed herein.

FIG. 8 is an embodiment of the steps performed by video rendering process 140-2 when it downloads the video packaged in a first protocol 120 from a remote server 190 to a local server 160 residing on the mobile device 110.

In step 221, the video rendering process 140-2 downloads the video packaged in a first protocol 120 from a remote server 190 to a local server 160 residing on the mobile device 110. The first protocol is selected based on a preferred download compatibility associated with the mobile device 110 and the remote server 190. In an example embodiment, the second protocol associated with the video controller 180 may not be the best protocol for communicating with the remote server 190, and a better protocol is available. The local server 160 uses the better protocol (i.e., the first protocol) to download the video from the remote server 190, and converts the video packaged in a first protocol 120 to a video packaged in a second protocol 165 where the second protocol is compatible with the video controller 180.

In step 222, the video rendering process 140-2 determines the second protocol results in an unstable connection between the mobile device 110 and the remote server 190. In an example embodiment, some second protocols can communicate with the remote server 190 but become unstable when the user 108 moves from location to location. For example, Real Time Streaming Protocol (RTSP) tends to be unstable when the user 108 holding the mobile device 110 moves from location to location.

In step 223, the video rendering process 140-2 selects the first protocol to download the video from the remote server 190. The first protocol is selected based on a stable connection between the mobile device 110 and the remote server 190. In an example embodiment, the video rendering process 140-2 determines that the second protocol associated with the video controller 180 can communicate with the remote server 190 but results in an unstable connection. The video rendering process 140-2 then identifies a first protocol that is stable when connected to the remote server 190, and selects that first protocol to use when downloading the video from the local server 160.

Alternatively, in step 224, the video rendering process 140-2 caches the video to the local server 160 for rendering at a later time. In an example embodiment, the video rendering process 140-2 downloads the video packaged in a first protocol 120 from the remote server 190 to the local server 160, and caches the video packaged in a first protocol 120 on the local server 160 (as a cached video 127) for rendering at a later time. In an example embodiment, the video rendering process 140-2 converts the video packaged in a first protocol 120 to a video packaged in a second protocol 165 prior to caching the video packaged in a second protocol 165 on the local server 160 (as a cached video 127) for rendering at a later time. The cached video 127 may be rendered faster on the mobile device 110 than the live streaming TV video rendered from the remote server 190.

Alternatively, in step 225, the video rendering process 140-2 renders a previously cached video 127 during the download of the video packaged in a first protocol 120 from the remote server 190 to the local server 160. In an example embodiment, when the user 108 selects a TV channel to watch, the video rendering process 140-2 immediately plays a cached video 127 for the user 108 to view, while the video rendering process 140-2 begins to download the video packaged in a first protocol 120 from the remote server 190. In an example embodiment, the video rendering process 140-2 renders the cached video 127 on the mobile device 110 while the video rendering process 140-2 converts the video packaged in a first protocol 120 to the video packaged in a second protocol 165. When the cached video 127 has completed, video rendering process 140-2 seamlessly transitions from rendering the cached video 127 to rendering the video packaged in a second protocol 165 on the mobile device 110.

Figure 9:
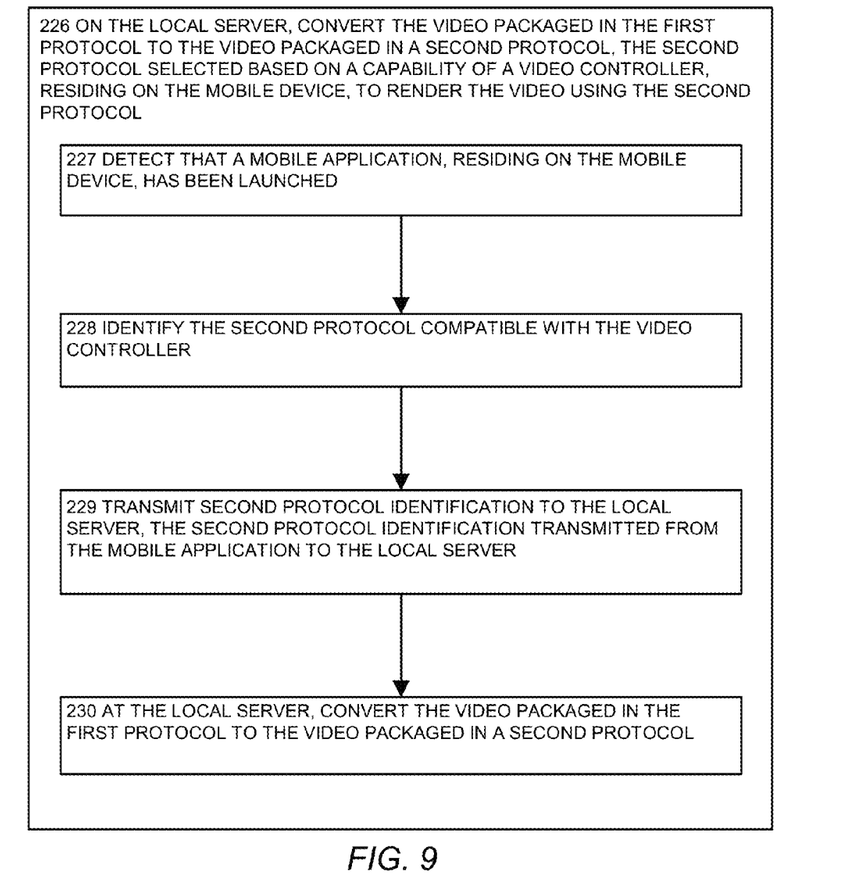
FIG. 9 illustrates a flowchart of a procedure performed by the system of FIG. 1, when the video rendering process converts the video packaged in the first protocol to the video packaged in a second protocol, according to one embodiment disclosed herein.

FIG. 9 is an embodiment of the steps performed by video rendering process 140-2 when it converts the video packaged in a first protocol 120 to the video packaged in a second protocol 165, on the local server 160.

In step 226, the video rendering process 140-2 converts the video packaged in a first protocol 120 to the video packaged in a second protocol 165, on the local server 160. The second protocol is selected based on a capability of a video controller 180, residing on the mobile device 110, to render the video packaged in a second protocol 165. In an example embodiment, the second protocol associated with the video controller 180 may not be compatible with the remote server 190. The video rendering process 140-2 downloads the video packaged in a first protocol 120 from the remote server 190 to the local server 160. The local server 160 converts the video packaged in a first protocol 120 to a video packaged in a second protocol 165, and transmits the video packaged in a second protocol 165 to the video controller 180 where video controller 180 renders the video packaged in a second protocol 165 on the mobile device 110.

In step 227, the video rendering process 140-2 detects that a mobile application 170, residing on the mobile device 110, has been launched. For example, a user 108 may turn on the mobile device 110, and in response, the mobile application 170 is launched.

In step 228, the video rendering process 140-2 identifies the second protocol compatible with the video controller 180. In an example embodiment, when the user 108 turns on the mobile device 110, the video rendering process 140-2 identifies the second protocol (i.e., second protocol identification 155) that is compatible with the video controller 180.

In step 229, the video rendering process 140-2 transmits the second protocol identification 155 to the local server 160. In an example embodiment, it is the mobile application 170 that transmits the second protocol identification 155 to the local server 160.

In step 230, the video rendering process 140-2, at the local server 160, converts the video packaged in a first protocol 120 to the video packaged in a second protocol 165. In an example embodiment, the video rendering process 140-2 identifies the second protocol (i.e., second protocol identification 155) compatible with the video controller 180. The mobile application 170 transmits the second protocol identification 155 to the local server 160, and the local server 160 converts the video packaged in a first protocol 120 to the video packaged in a second protocol 165.

Figure 10:
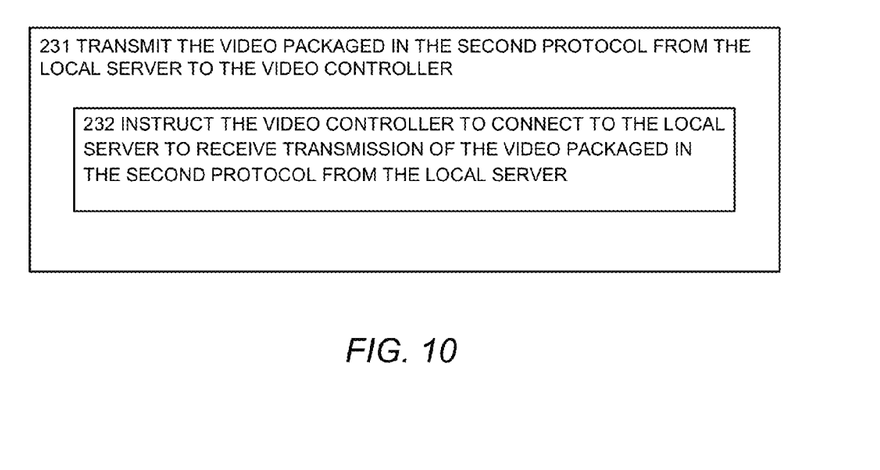
FIG. 10 illustrates a flowchart of a procedure performed by the system of FIG. 1, when the video rendering process transmits the video packaged in the second protocol from the local server to the video controller, according to one embodiment disclosed herein.

FIG. 10 is an embodiment of the steps performed by video rendering process 140-2 when it transmits the video packaged in a second protocol 165 from the local server 160 to the video controller 180.

In step 231, the video rendering process 140-2 transmits the video packaged in a second protocol 165 from the local server 160 to the video controller 180. In an example embodiment, the local server 160 transmits the video packaged in a second protocol 165 to the video controller 180 where the video controller 180 renders the video packaged in a second protocol 165.

In step 232, the video rendering process 140-2 instructs the video controller 180 to connect to the local server 160 to receive transmission of the video from the local server 160. In an example embodiment, the local server 160 downloads the video packaged in a first protocol 120 from the remote server 190, and converts the video packaged in a first protocol 120 to a video packaged in a second protocol 165. The video rendering process 140-2 instructs the video controller 180 to connect to the local server 160 to receive the video packaged in a second protocol 165. The local server 160 transmits the video packaged in a second protocol 165 to the video controller 180, and the video controller 180 renders the video packaged in a second protocol 165.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method of rendering a video on a mobile device, the method comprising:
   downloading the video from a remote server to a local server residing on the mobile device, the video packaged in a first protocol, the first protocol selected based on a preferred download compatibility associated with the mobile device and the remote server;
   on the local server, converting the video packaged in the first protocol to the video packaged in a second protocol, the second protocol selected based on a capability of a video controller, residing on the mobile device, to render the video using the second protocol;
   transmitting the video packaged in the second protocol from the local server to the video controller; and
   using the video controller, rendering the video packaged in the second protocol on the mobile device.

2. The method of claim 1 comprising:
   providing an updated first protocol to the mobile device; and
   instructing the local server to use the updated first protocol when downloading the video from the remote server to the local server.

3. The method of claim 1 wherein downloading the video from a remote server to a local server residing on the mobile device, the video packaged in a first protocol, the first protocol selected based on a preferred download compatibility associated with the mobile device and the remote server comprises:
   selecting the first protocol from at least one of:
   i) a plurality of available protocols due to an established download success between the first protocol and the remote server;
   ii) a plurality of available protocols due to a greater download success between the first protocol and the remote server as compared to a lesser download success between with the second protocol and the remote server; and
   iii) a plurality of available protocols due to probability of a download success associated between the first protocol and a plurality of remote servers, selection of the first protocol reducing a number of protocols required on the mobile device to download the video from each of the plurality of remote servers.

4. The method of claim 1 wherein downloading the video from a remote server to a local server residing on the mobile device, the video packaged in a first protocol, the first protocol selected based on a preferred download compatibility associated with the mobile device and the remote server comprises one of:
   selecting the first protocol based on a download rate between the first protocol and the remote server; and
   dynamically selecting the first protocol based on the download rate between the first protocol and the remote server at the time of the download of the video.

5. The method of claim 1 wherein downloading the video from a remote server to a local server residing on the mobile device, the video packaged in a first protocol, the first protocol selected based on a preferred download compatibility associated with the mobile device and the remote server comprises:
   transmitting selection of the first protocol from a mobile application residing on the mobile device to the local server; and
   instructing the local server to download the video from the remote server using the first protocol.

6. The method of claim 5 wherein transmitting selection of the first protocol from a mobile application residing on the mobile device to the local server comprises:
   receiving protocol information associated with the first protocol, the protocol information received by the mobile application from a main authorization server; and
   based on the protocol information, selecting the first protocol, and transmitting selection of the first protocol from the mobile application to the local server.

7. The method of claim 1 wherein downloading the video from a remote server to a local server residing on the mobile device, the video packaged in a first protocol, the first protocol selected based on a preferred download compatibility associated with the mobile device and the remote server comprises:
   detecting that the second protocol is incompatible with the remote server;

selecting the first protocol to download the video from the remote server, the first protocol selected based on an ability to communicate with the remote server; and utilizing the local server to download the video, using the first protocol, from the remote server to the local server.

8. The method of claim 1 wherein downloading the video from a remote server to a local server residing on the mobile device, the video packaged in a first protocol, the first protocol selected based on a preferred download compatibility associated with the mobile device and the remote server comprises:

determining the second protocol results in an unstable connection between the mobile device and the remote server; and selecting the first protocol to download the video from the remote server, the first protocol selected based on a stable connection between the mobile device and the remote server.

9. The method of claim 1 wherein downloading the video from a remote server to a local server residing on the mobile device, the video packaged in a first protocol, the first protocol selected based on a preferred download compatibility associated with the mobile device and the remote server comprises:

caching the video to the local server for rendering at a later time.

10. The method of claim 1 wherein downloading the video from a remote server to a local server residing on the mobile device, the video packaged in a first protocol, the first protocol selected based on a preferred download compatibility associated with the mobile device and the remote server comprises:

rendering a previously cached video during the download of the video from the remote server to the local server.

11. The method of claim 1 wherein on the local server, converting the video packaged in the first protocol to the video packaged in a second protocol, the second protocol selected based on a capability of a video controller, residing on the mobile device, to render the video using the second protocol comprises:

detecting that a mobile application, residing on the mobile device, has been launched;

identifying the second protocol compatible with the video controller;

transmitting second protocol identification to the local server, the second protocol identification transmitted from the mobile application to the local server; and at the local server, converting the video packaged in the first protocol to the video packaged in a second protocol.

12. The method of claim 1 wherein transmitting the video packaged in the second protocol from the local server to the video controller comprises:

instructing the video controller to connect to the local server to receive transmission of the video packaged in the second protocol from the local server.

13. The method of claim 1 wherein the first protocol and the second protocol are different from each other.

14. A non transitory computer readable medium having computer readable code thereon, the medium comprising:

instructions for downloading a video from a remote server to a local server residing on a mobile device, the video packaged in a first protocol, the first protocol selected based on a preferred download compatibility associated with the mobile device and the remote server;

on the local server, instructions for converting the video packaged in the first protocol to the video packaged in a second protocol, the second protocol selected based on a capability of a video controller, residing on the mobile device, to render the video using the second protocol;

instructions for transmitting the video packaged in the second protocol from the local server to the video controller; and instructions for using the video controller, rendering the video packaged in the second protocol on the mobile device.

15. The non transitory computer readable medium of claim 14 comprising:

instructions for providing an updated first protocol to the mobile device; and instructions for instructing the local server to use the updated first protocol when downloading the video from the remote server to the local server.

16. The non transitory computer readable medium of claim 14 wherein the instructions for downloading the video from a remote server to a local server residing on the mobile device, the video packaged in a first protocol, the first protocol selected based on a preferred download compatibility associated with the mobile device and the remote server comprise:

instructions for selecting the first protocol from at least one of:

i) a plurality of available protocols due to an established download success between the first protocol and the remote server;

ii) a plurality of available protocols due to a greater download success between the first protocol and the remote server as compared to a lesser download success between with the second protocol and the remote server; and iii) a plurality of available protocols due to probability of a download success associated between the first protocol and a plurality of remote servers, selection of the first protocol reducing a number of protocols required on the mobile device to download the video from each of the plurality of remote servers.

17. The non transitory computer readable medium of claim 14 wherein the instructions for downloading the video from a remote server to a local server residing on the mobile device, the video packaged in a first protocol, the first protocol selected based on a preferred download compatibility associated with the mobile device and the remote server comprise:

instructions for selecting the first protocol based on a download rate between the first protocol and the remote server.

18. The non transitory computer readable medium of claim 14 wherein the instructions for downloading the video from a remote server to a local server residing on the mobile device, the video packaged in a first protocol, the first protocol selected based on a preferred download compatibility associated with the mobile device and the remote server comprise:

instructions for detecting that the second protocol is incompatible with the remote server;

instructions for selecting the first protocol to download the video from the remote server, the first protocol selected based on an ability to communicate with the remote server; and instructions for utilizing the local server to download the video, using the first protocol, from the remote server to the local server.

19. The non transitory computer readable medium of claim 14 wherein the instructions for downloading the video from a remote server to a local server residing on the mobile device, the video packaged in a first protocol, the first protocol selected based on a preferred download compatibility associated with the mobile device and the remote server comprise:

instructions for rendering a previously cached video during the download of the video from the remote server to the local server.

20. A computerized mobile device comprising:

a memory;

a processor;

a communications interface;

a video controller configured for rendering a video packaged according to a second protocol on the computerized mobile device, the second protocol being based on a capability of the video controller to render the video using the second protocol;

an interconnection mechanism coupling the memory, the processor, the video controller and the communications interface;

wherein the memory is encoded with a video rendering application that when executed on the processor is capable of rendering a video on the computerized mobile device by performing the operations of:

downloading a given video from a remote server to a local server residing on the computerized mobile device, the video packaged according to a first protocol, the first protocol selected based on a preferred download compatibility associated with the computerized mobile device and the remote server;

on the local server, converting the given video packaged according to the first protocol to the video packaged according to the second protocol;

transmitting the video packaged according to the second protocol from the local server to the video controller; and using the video controller, rendering the video packaged according to the second protocol on the computerized mobile device.

* * * * *